United States Patent Office 3,536,440
Patented Oct. 27, 1970

3,536,440
PROCESS FOR THE DYEING AND PRINTING OF FIBRE SUBSTRATES
Karl Dinges, Cologne-Stammheim, and Erwin Müller and Wilhelm Berlenbach, Leverkusen, Germany, assignors to Farbenfabriken Bayer Aktiengesellschaft, Leverkusen, Germany, a corporation of Germany
No Drawing. Filed May 26, 1967, Ser. No. 641,499
Claims priority, application Germany, June 3, 1966, F 49,379
Int. Cl. D06p 1/52
U.S. Cl. 8—115.6                                      7 Claims

ABSTRACT OF THE DISCLOSURE

In a process for treating fibers by applying a pigment and an aqueous emulsion of a curable pigment binder wherein said binder comprises a copolymer of (a) a comonomer and (b) an olefinically unsaturated monomer, the improvement which comprises using as comonomer (a) a number of the general formula

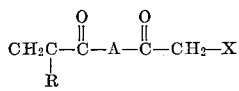

---

It is known to use aqueous dispersions of high molecular polymers or copolymers when dyeing or printing textiles with pigments. This leads to good fastness of the prints and dyeings to washing and rubbing, if the polymer used as binding agent contains reactive groups which enable the polymer film to be cross-linked on the fibre substrate. Such reactive groupings can be, for example, carboxyl groups, carbonamide groups, chlorine atoms, aldehyde groups and similar groupings which react with added polyfunctional cross-linking agents, for example, with water-soluble basic polymers, urea-formaldehyde resins or melamine-formaldehyde resins on the fabric to form cross-linked insoluble polymer films.

Especially suitable polymers are those which are capable of being cross-linked with themselves as well as with the substrate under the conditions of suitable fixation methods. Polymers of this type contain as cross-linking component, for example, acrylic or methacrylic acid amide, the amide group of which is substituted by methylol, methylolalkyl ether or methylol ester groups. The comonomers used in the emulsion copolymerisation comprise acrylic acid ester, methacrylic acid ester, styrene and its derivatives, acrylonitrile, vinyl ester, vinyl ether, vinylidene chloride, acrylic acid, methacrylic acid, acrylamide, methacrylamide, and also diolefines, especially butadiene.

The monomers are selected in accordance with the practical demands made on elasticity, plasticity, softening point, stability to light and resistance to solvents (particularly to chlorinated hydrocarbons) of the polymer film.

The fixation of such self-cross-linking copolymers is carried out by means of dry heat in an acid medium according to the following mechanism:

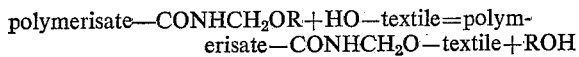

(R is H or alkyl).

The fixation is the more satisfactory, the more completely the volatile components of the right-hand side of the reaction equilibrium are removed. Consequently, only an incomplete fixation, or none at all, can be achieved under the conditions of moist steam as is produced in continuous steaming apparatus.

The acidic medium is preferably produced by the addition of acid-yielding agents which become effective only in the hot, for example, ammonium or amine salts of strong acids.

Although dispersions of such copolymers may meet very well the practical requirements of textile printing, they nevertheless have some disadvantages, due to the fixing mechanism which requires an acidic medium and dry heat, preferably hot air, and this makes their application in important fields of textile printing impossible or more difficult and expensive. When dispersion binders of the said type are used in the simultaneous printing of pigment dyestuffs with vat or developing dyestuffs or other classical dyestuffs, the steaming process for developing the last-mentioned dyestuffs must be followed by a treatment with hot air for fixing the pigment prints; this renders the production process so much more difficult and expensive that this simultaneous printing has hitherto hardly been adopted in practice, although it would frequently be the ideal printing process under coloristic considerations. With a number of fibres, for example, those of polyacrylonitrile or superpolyamide, the action of dry heat moreover leads to yellowing, unless it is very carefully dosed. On the other hand, moist steam has no adverse effect.

Many textile printing works have steaming aggregates for developing or fixing prints obtained with classical dyestuffs, but they have no capacity or only an insufficient capacity for fixing with dry heat. Consequently, they cannot carry out pigment printing with the aforesaid dispersion binders when good fastness to wear and washing of the pigment prints, is considered to be important.

It has now been found that aqueous emulsion copolymers of acrylic acid or methacrylic acid derivatives containing a terminal halomethyl-carbonyl grouping with olefinically unsaturated monomers are particularly suitable binding agents for pigment printing.

Compared with the known binding agents based on emulsion copolymers which can be cross-linked in the presence of acids in dry heat, the copolymers to be used according to the present invention have the advantage that they can be cross-linked in an alkaline medium in moist or dry heat, with themselves if the copolymers contain alcoholic hydroxyl groups, or with high-molecular substrates containing hydroxyl groups, for example, fibre materials such as cotton or staple fibre. Accordingly the copolymers to be used according to the present invention are particularly suitable for dyeing or printing of fibre materials consisting of natural or regenerated cellulose. The simultaneous printing of, for example, pigment dyestuffs with the usually alkaline vat, reactive and developing dyestuffs is thus possible without difficulty. To achieve cross-linking of the reactive groups, it is not necessary to work in dry heat; fixation can also be carried out in moist steam or in drying chambers. The alkaline medium of the printing pastes corresponds to that of pastes made of vat, reactive and developing dyestuffs; simultaneous printing with these and other classes of dyestuffs can now easily be performed, since all classes of dyestuffs used in the simultaneous printing, including the pigment print, are fixed by moist steam and an additional fixation with hot air is not necessary.

It is of no importance for the fixation of the binding agents applied according to the invention, whether the printing pastes or padding solutions contain free alkali from the start and are adjusted to a pH value of 10 to 12, for example, by means of sodium hydroxide, sodium carbonate or potassium carbonate, or whether the alkaline medium is produced only after application of the binding agent to the fibre substrate, by the addition of alkali-yielding agents, such as sodium acetate, sodium trichloroacetate, etc., in the hot and/or in steam and/or by heating the dried printed or dyed material. When alkali-yielding agents are used, higher temperatures must be applied to achieve the same fastness properties as are obtained with the use of free alkali. It is also possible to use printing pastes which are free from alkalies or alkali-yielding agents and to carry out the fixation after printing or padding, by impregnating the printed and dried fabric with an aqueous-alkaline solution by the padding and slop padding process, followed by steaming or sharp drying.

Printing and dyeing with the copolymer dispersions to be used according to the present process is carried out by known methods according to the roller, film or spray printing process. The printing pastes are preferably built up according to the oil-in-water emulsion system containing the binder in the external aqueous phase. In addition, they may contain other conventional auxiliaries, for example, fillers, plasticisers, emulsifiers, dissolved thickeners based on cellulose, alginates, tragacanth, polyacrylamide, the ammonium salt of polyacrylic acid and the like. It is also possible to use water-in-oil emulsions, if these are combined with pigment dispersions in water-insoluble organic liquids.

Pigment dyestuds of organic as well as inorganic nature can be used. They are chosen in accordance with the practical requirements regarding the brilliancy and fastness to light, sodium carbonate, boiling, perspiration, ironing, chlorine, rubbing and solvents. The dyestuffs may belong to a great variety of classes; organic dyestuffs, for example, to the azo, anthraquinone, azaporphin, thioindigo or polycyclic series, and also to the quinacridone, dioxazine, naphthalene-tetracarboxylic acid or perylene-tetracarboxylic acid series. A great number of such pigment dyestuffs are known, for example, from Colour Index, 2nd edition. Of the series of azo pigment dyestuffs, monoago dyestuffs derived from diazo components of the benezene series and coupling components of the 2,3-hydroxynaphthoic acid arylamide or acylacetic acid amide series should be specially mentioned.

Laked dyestuffs, such as the Ca-, Mg- and Al-lakes of azo dyestuffs containing sulphonic acid and/or carboxylic acid groups, can also be suitable as pigment dyestuffs.

Suitable inorganic pigments are, for example, zinc sulphide, titanium dioxide, cadmium sulphide, iron oxide, antimony oxide. Soot must also be mentioned as a valuable black pigment.

The dyeing of fabrics by padding with pigment preparations can also be carried out by known processes, for example, on the foulard. Besides the dissolved or dispersed polymer dispersion, the padding liquor may contain any conventional additives, such as protective colloids, emulsifiers, plasticisers, organic solvents and the like.

The acrylic acid and methacrylic acid derivatives with a terminal halomethyl-carbonyl grouping, which are suitable for the production of the copolymer emulsions to be used according to the present process, correspond to the general formula $$CH_2=C-\overset{O}{\underset{R}{\overset{\|}{C}}}-A-\overset{O}{\overset{\|}{C}}-CH_2-X \qquad (I)$$

in which R is hydrogen or CH$_3$, A is a

—NH—CH$_2$—NH—, —NH—CO—NH—

group and X is a chloro or bromo substituent.

Examples of suitable monomers of the Formula I are:

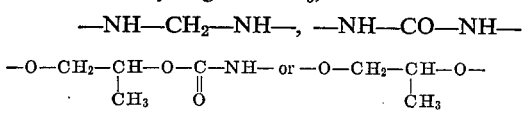

| | |
|---|---|
| CH$_2$=C̈—CO—NH—CH$_2$—NH—CO—CH$_2$—Cl | M.P. 143° C. |
| CH$_2$=CH—CO—NH—CH$_2$—NH—CO—CH$_2$Cl | M.P. 183° C. |
| CH$_2$=CH—CO—NH—CH$_2$—NH—CO—CH$_2$Br | M.P. 176° C. |

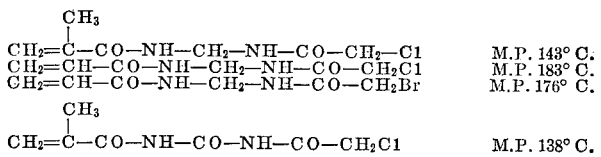

M.P. 138° C.

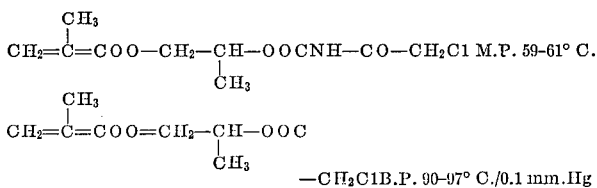

M.P. 59–61° C.

—CH$_2$ClB.P. 90–97° C./0.1 mm.Hg

The monomers are produced by known methods. For example, the compound

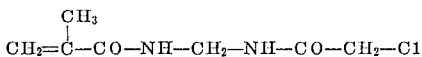

is obtained by reacting methacrylamide with N-methylol-chloroacetamide, the compound

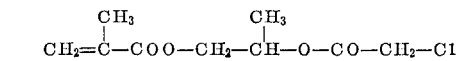

by reacting methacrylic acid-β-hydroxypropyl ester with chloroacetic acid, and the compound

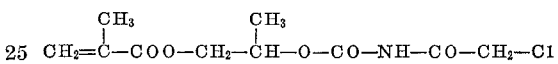

is obtained from methacrylic acid-β-hydroxypropyl ester and chloroacetyl isocyanate.

The monomers of the general Formula I are used for the copolymerisation in an aqueous emulsion in amounts of 0.2–50 percent by weight, preferably in amounts of 0.5–20 percent by weight based on the total amount of monomers.

The following olefinically unsaturated monomers can be used as copolymerisation components, for example:

(a) α,β-Olefinically unsaturated mono- and dicarboxylic acids and their derivatives, such as acrylic and methacrylic acid amides, acrylo- and methacrylo-nitrile, esters of acrylic and methacrylic acid, especially those with saturated monohydric aliphatic or cycloaliphatic alcohols containing 1 to 20 carbon atoms, such as the esters of the aforesaid acids with methyl, ethyl, propyl, isopropyl, isobutyl, hexyl, octyl and stearyl alcohol, cyclohexanol, methyl-cyclohexanol, and also with benzyl alcohol, phenol, cresol, furfuryl alcohol; monoesters of α,β-mono-olefinically unsaturated monocarboxylic acids containing 3 to 4 carbon atoms with dihydric saturated aliphatic alcohols containing 2 to 4 carbon atoms, such as 2-hydroxyethyl methacrylate, 2-hydroxypropyl methacrylate, 4-hydroxybutyl methacrylate, 2-hydroxyethyl acrylate, 2-hydroxypropyl acrylate, 4-hydroxybutyl acrylate and the corresponding diesters; esters of acrylic and methacrylic acid with unsaturated aliphatic alcohols.

(b) Aromatic monovinyl compounds, such as styrene, α-methyl-styrene, vinyl-toluene, p-chlorostyrene, styrene-sulphonic acid or other nuclear-substituted vinyl-benzenes and divinyl-benzene.

(c) Esters of vinyl alcohol with carboxylic acid or hydrohalic acids, vinyl ethers, vinyl ketones, vinyl chloride, vinylidene chloride, vinyl acetate, vinyl propionate, vinyl-ethyl ether, vinyl-isobutyl ether.

(d) Conjugated diolefines with 4 to 6 carbon atoms, such as butadiene, isoprene, 2,3 - dimethyl-butadiene, chloroprene.

(e) N-methylol ethers of acrylic acid and methacrylic acid amides corresponding to the formula

in which R stands for hydrogen or methyl, R$_1$ for hydrogen, alkyl, aralkyl or aryl, R$_2$ for alkyl or cycloalkyl, such as methyl, ethyl, n-propyl, isopropyl, n-butyl, isobutyl, cyclohexyl (cf. German published specification No. 1,035,363).

(f) Mannich bases of acrylic acid and methacrylic acid amide corresponding to the formula

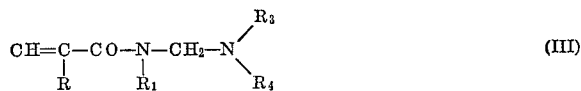 (III)

in which R and $R_1$ have the same meaning as in Formula II and $R_3$ and $R_4$ stand for cycloalkyl or alkyl radicals which together may also form part of heterocyclic radical, such as the morpholine radical. Suitable compounds of this type are mentioned in German published specification No. 1,102,404.

In addition, other mono-olefinically unsaturated monomers can be used as copolymerisation components, such as unsaturated aliphatic or cycloaliphatic hydrocarbons. Cross-linking monomers with several non-conjugates olefinically unsaturated groups can also be used in amounts of about 0.01 to 5 preferably 0.01 to 3 percent by weight, referred to the total weight of monomes, such as glycol diacrylate, glycol dimethacrylate, acrylic acid and/or methacrylic acid allyl esters, divinyl-benzene, triacryloyl-perhydro-s-triazine, triallyl cyanurate or substitution products of the aforesaid compounds.

It is possible to produce copolymers from two or also from a greater number of different monomers. The selection of the monomers from the groups mentioned above depends upon the desired properties of the prints or dyeings. For example, prints with a particular pleasant feel are obtained by using high proportions of butadiene or of acrylic acid esters or vinyl ethers of higher alcohols. If it is desired to produce a pad-dyeing with stiffening of the fabric, then it is advisable to use a copolymer with a high proportion of acrylonitrile.

Monomers containing carboxyl groups, such as acrylic and methacrylic acid are generally incorporated in the copolymers in comparatively small amounts, unless it is intended to produce copolymers with strong hydrophobic properties. For the production of copolymers which are obtained by polymerisation of the monomers in an aqueous emulsion, the said olefinically unsaturated carboxylic acids are preferably used in amounts of 0.1 to 10 parts by weight, calculated on the total weight of monomers. The amides of the said acids are also preferably used in the stated amounts.

Hydroxyalkyl esters of acrylic and/or methacrylic acid are preferably used in amounts of 0.2 to 20 percent by weight, referred to the total weight of monomers.

If acrylic or methacrylic acid nitrile is used, these are added in amounts of up to 30 percent by weight, referred to the total weight of monomers.

The monomers according to the general Formulae II and III are preferably used in amounts of 0.1 to 15 percent by weight, calculated on the total weight of monomers.

The copolymerisation of the said monomers is carried out in known manner in an aqueous emulsion with the use of emulsifying agents. Cation-active, anion-active and non-ionic emulsifiers can be used for this purpose.

Examples of suitable anion emulsifiers are higher fatty acids, resinic acids, acidic fatty alcohol-sulphuric acid esters, higher alkylsulphonates and alkylaryl-sulphonates, sulphonated castor oil, higher hydroxyalkyl-sulphonates, sulphosuccinic acid ester, salts of fatty acid condensation products with hydroxyalkyl-carboxylic acids, aminoalkyl-carboxylic acids, water-soluble salts of sulphonated ethylene oxide addition products.

Examples of cationic emulsifiers are salts of alkylamines, aryl-, alkylaryl- or resin-amines, inorganic acids and salts of quaternary ammonium compounds.

Suitable emulsifiers of non-ionic character are the known reaction products of ethylene oxide with long-chain fatty alcohols, such as cetyl, lauryl, oleyl, octadecyl alcohols or alkylphenols, such as octyl- or dodecyl-phenol, reaction products obtained from more than 10 moles, preferably 15 to 20 moles, ethylene oxide and 1 mole fatty alcohol or alkylphenol being preferred.

The total amount of the emulsifiers mentioned above may be between 0.5 and 20%, referred to the total amount of monomers. It preferably ranges from 2 to 10%.

Polymerisation is preferably carried out at temperatures of about 10 to 70° C., but temperatures up to 80° C. can also be applied.

The copolymers to be used according to the invention can of course also be graft polymers which are obtained in known manner by polymerisation or copolymerisation of the aforesaid monomers in the presence of previously formed polymers, for example from conjugated diolefines, such as butadiene.

The pH value to be maintained during the production of the copolymers may vary within wide limits, expediently between pH 2 and 6, preferably between 2 and 4.

Compounds which control the molecular weight, such as long-chain alkylmercaptans, diisopropyl xanthogenate and others can be added.

Suitable polymerisation catalysts are inorganic per-compounds, such as potassium or ammonium persulphate, hydrogen peroxide, percarbonates; organic peroxide compounds, such as acyl peroxides, for example, benzoyl peroxide; alkyl hydroperoxides, such as butyl hydroperoxide, cumol hydroperoxide, p-menthane hyroperoxide, dialkyl peroxides, such as di-tert.-butyl peroxide. The inorganic or organic per-compounds are advantageously used in known manner in combination with reducing agents. Suitable reducing agents, are, for example, sodium pyrosulphite or bisulphite.

The amount of catalyst to be used lies within the customary limits for polymerisation of this type, i.e. between 0.01 and 5%, calculated on the total of monomers used.

The parts given in the following examples are parts by weight unless otherwise stated.

EXAMPLE 1

In a reaction vessel fitted with stirrer, thermometer and gas feed tube 400 parts of the mixture of monomers stated below are added to a solution in 550 parts of water, of 20 parts of a reaction product of 20 moles ethylene oxide with 1 mole nonyl phenol, 2 parts of an alkyl-sulphonate with 12 to 14 carbon atoms and 2 parts of a condensation product obtained from naphthalene-sulphonic acid and formaldehyde to form an emulsion. 20 percent by weight of this emulsion are transferred to a similar reaction vessel and heated with stirring to 55° C. while nitrogen is passed through. After 10 minutes there is added a solution consisting of 0.24 part potassium persulphate and 0.32 part sodium pyrosulphite, each dissolved in 5 parts of water. The remaining 80 percent by weight of the emulsion as well as a solution of 0.96 part potassium persulphate in 20 parts of water and a solution of 1.28 parts sodium pyrosulphite in 20 parts of water are added in a constant flow to the above solution in the course of 3 hours. The polymerisation is largely completed after a further 3 to 4 hours. Stirring is continued for about 4 hours and a 37 to 39% dispersion is thus obtained.

After triturating to dryness, a few drops of this dispersion can be stirred again with water to give the original dispersion without the formation of a coagulate.

Mixture of monomers:

56% acrylic acid butyl ester
30% styrene
4% methacrylic acid-β-hydroxypropyl ester
2.5% acrylamide
7.5% $H_2C=CH-CO-NH-CH_2$
—NH—CO—$CH_2$—Cl 200 parts of the above dispersion are mixed with 100 parts of a 30% dispersion of soot in water, 50 parts of a 4% aqueous tragacanth solution, 8 parts of a hydroxyethylation product of 1 mole cetyl alcohol and 15 moles ethylene oxide serving as emulsifier and 182 parts of water. 450 parts of heavy benzine are then stirred into the mixture with a rapid stirrer (about 2900 r.p.m.) to form an emulsion, and 30 parts of a 33% potassium carbonate solution are then added. The viscous paste thus formed is applied to cotton and staple fibre by roller printing according to the usual methods. The deep black print is fast to washing, rubbing and scrubbing after drying for 8 minutes in the moist steam (about 98° C.) of a continuous steaming apparatus or for 5 minutes at 130° C. or for 2 minutes at 150° C. in a hot air fixing apparatus.

EXAMPLE 2

The printing paste produced as in Example 1, but without potassium carbonate, is applied to cotton and staple fibre by roller printing, well dried, subsequently impregnated with a 2% sodium hydroxide solution by the padding process with a squeezing effect of 80%, and immediately afterwards either steamed in a continuous steaming apparatus for 5 minutes or treated in a hot air chamber at 140° C. for 5 minutes. The fastness to wear and rubbing are virtually the same as those of the print of Example 1.

EXAMPLE 3

From a mixture of

78% acrylic acid ethyl ester
6.5% methacrylic acid-$\beta$-hydroxypropyl ester
2.5% acrylamide
5.0% methacrylamide-methylol methyl ether
8.0% $H_2C=C(CH_3)-COO-CH_2-CH(CH_3)-O-CO-NH-CO-CH_2-Cl$ an approximately 40% polymer dispersion is prepared as described in Example 1. 100 parts of this dispersion are mixed with 8 parts O-benzyloxy-diphenyl polyglycol ether, 30 parts of a 4% hydroxyethyl cellulose of medium viscosity as thickening agent, 197 parts of water and 20 parts urea and this mixture is subsequently emulsified with 600 parts of heavy benzine. A paste of medium viscosity is thus obtained. By combining this paste with 20 parts of a 40% dispersion of perchlorinated copper phthalocyanine (Colour Index [1956] vol. III, No. 74,280) and 25 parts of a 20% sodium carbonate solution there is obtained a printing paste A, in combination with 20 parts of a 40% dispersion of a red azo dyestuff (e.g. the dyestuff No. 12,370 from Colour Index [1956] vol. III) and 25 parts of a 20% sodium carbonate solution there is obtained a printing paste B.

Each of the printing pastes A and B is applied by means of a screen printing machine to cotton and staple fibre where they produce a bright full green and red print according to the pattern. Both prints are fast to scrubbing, boiling, washing and rubbing when treated, after drying, either in a star steamer or continuous steamer for 5 minutes or with hot air at 150° C. for 2 minutes or with hot air at about 80° C. for 15 minutes.

EXAMPLE 4

From a mixture of

56% acrylic acid butyl ester
34% vinyltoluene
2.5% methacrylamide
7.5% $H_2C=C(CH_3)-COO-CH_2-CH(CH_3)-O-CO-CH_2-Cl$ a 40% polymer dispersion is prepared as described in Example 1. 250 parts of this dispersion are mixed with 200 parts of a dispersion of 600 parts of powdered titanium dioxide in 400 parts of softened water, 100 parts of an 8% alginate solution of medium viscosity, 245 parts of a 70% heavy benzine-in-water emulsion and 25 parts of a 33% aqueous potassium carbonate solution, and this printing paste is applied by table printing to cotton and viscose satin which was previously dyed black. A full covering white print is obtained which, after drying, is either steamed for 5 minutes or treated wth hot air at 100 to 120° C. for 10 minutes. The print is then fast to boiling, washing, scrubbing and rubbing. The 70% heavy benzine emulsion is prepared by emulsifying 700 parts heavy benzine with a solution of 10 parts oleyl alcohol polyglycol ether in 290 parts of water.

EXAMPLE 5

From a mixture of

80% acrylic acid ethyl ester
9.4% methacrylic acid-2-ethylhexyl ester
4.4% methacrylic acid-$\beta$-hydroxypropyl ester
6.2% $H_2C=C(CH_3)-CO-NH-CO-NH-CO-CH_2-Cl$ a 40% polymer dipsersion is prepared as described in Example 1. 150 parts of this dispersion are mixed with 30 parts of a 40% aqueous disperson of the yellow azo dyestuff No. 20,040 from Colour Index [1956], vol. III, 30 parts of a 40% aqueous dispersion of perchlorinated copper phthalocyanine (Colour Index [1956] vol. II, No. 74,280), 100 parts of a 4% tragacanth solution, 665 parts of a 70% heavy benzine-in-water emulsion and 25 parts of a 20% sodium carbonate solution. The mixture so obtained is applied in a "base printing" process simultaneously with printing pastes containing fast-dyeing salts by means of rollers to cotton previously padded with 2,3-hydroxynaphthoic acid-phenylamide. After the printed fabric has been well dried in a drying chamber at 90° C. for about 4 minutes, it is thoroughly washed with a strongly diluted sodium carbonate solution at about 60° C. and vigorously rinsed. Besides a naphthol combination print there is obtained a brilliant yellow-green pigment print of good fastness to boiling, washing, scrubbing and rubbing.

EXAMPLE 6

From a mixture of

60% acrylic acid butyl ester
20% styrene
10% acrylonitrile
5% methacrylic acid-$\beta$-hydroxypropyl ester
5% $H_2C=CH-COO-CH_2-CH(CH_3)-O-CO-CH_2-Cl$ a 40% polymer dispersion is prepared as described in Example 1. 100 parts of this dispersion as mixed with 8 parts cetyl alcohol polyglycol ether, 202 parts of water, 40 parts of a 25% sodium acetate solution (buffered to pH 7 with acetic acid), 100 parts of a 2% hydroxyethyl cellulose and the mixture is subsequently emulsified with 550 parts heavy benzene. The emulsion so prepared can be processed with a 30 to 40% pigment dispersion to produce printing pastes. For example, 970 parts of the above emulsion and 30 parts of a 30% dispersion of a blue phthalocyanine dyestuff, e.g. the dyestuff No. 74,160 from Colour Index [1956] vol. III, yield a printing paste which, when applied by screen printing on cotton or staple fibre, gives a bright deep blue shade in accordance with the pattern; after drying and subsequent treatment in a star steamer or continuous steamer at a steam temperature of 100° C. for 10 minutes, the print is fast to boiling, washing, rubbing and scrubbing.

The same fastness properties are achieved when the print is not treated with steam but with hot air at 110–140° C. for 8 minutes.

EXAMPLE 7

300 g. of an alkyl sulphonate containing 12–16 carbon atoms, 120 g. of an ethoxylation product of lauryl alcohol and 20 mols of ethylene oxide, 48 g. of a condensation product of naphthalene sulphonic acid formaldehyde, 12 g. of sodium pyrophosphate, 360 g. of the compound $$H_2C=CH-CO-NH-CH_2-NH-CO-CH_2-Cl$$

as well as 480 g. of methacrylic acid are dissolved in 9600 g. of desalted water in a 40 l. VA-autoclave with stirring. The solution is cooled to 10° C. and 30 g. of tertiary dodecyl mercaptane, dissolved in 4080 g. of acrylonitrile, are then added. After closing the vessel 6950 g. of butadiene are introduced under pressure.

The emulsion is tempered at 18–20° C. and activated with (1) a solution of 0.075 g. of ferrous sulphate and 9.8 g. of sodium formaldehyde sulphoxylate in 60 g. of desalted water, which has been adjusted to pH 4 with dilute sulphuric acid;

(2) a solution of 9.8 g. of tertiary butyl hydroperoxide in 60 g. of acrylonitrile. Polymerisation starts after 2–3 hours.

The following additives are introduced in the course of the reaction:

At a conversion rate of 4%: 24 g. of sodium pyrophosphate in 750 g. of water;

At a conversion rate of 12%: 30 g. of tertiary dodecyl mercaptan dissolved in 60 g. of acrylonitrile;

At a conversion rate of 60%: 60 g. of an alkyl sulphonate containing 12–16 carbon atoms 48 g. of a condensation product of naphthalene sulphonic acid and formaldehyde as well as 120 g. of an ethoxylation product of lauryl alcohol and 20 mols of ethylene oxide, dissolved in 750 g. of water.

After the latex has reached a concentration of 47–48% by weight (conversion rate 94–96%) the polymerisation is stopped by the addition of a solution of 120 g. of sodium dithionite, 6 g. of the sodium salt of ethylenediamine-N,N'-tetra acetic acid as well as 24 g. of an ethoxylation product of lauryl alcohol and 20 mols of ethylene oxide in 900 g. of water.

After the addition of an antioxidant the excess monomers are removed from the polymerisation emulsion by distillation in vacuum at 40° C. A stable latex having a polymer content of 48–49% by weight is obtained.

According to the recipe of Example 7, stable latice having a polymer content of 48–49% by weight can be produced from the following monomers:

(a)

|  | Percent by wt. |
| --- | --- |
| Butadiene | 58 |
| Acrylonitrile | 35 |
| Methacrylic acid | 2 |
| Compound of the formula $H_2C=CH-CO-NH-CH_2-NH-CO-CH_2-Cl$ | 5 |

(b)

| Butadiene | 56 |
| --- | --- |
| Acrylonitrile | 35 |
| Compound of the formula $H_2C=CH-CO-NH-CH_2-NH-CO-CH_2-Cl$ | 3 |
| β-Hydroxypropyl methacrylate | 2 |
| Methacrylic acid | 4 |

(c)

| Butadiene | 58 |
| --- | --- |
| Acrylonitrile | 35 |
| Compound of the formula $H_2C=CH-CO-NH-CH_2-NH-CO-CH_2-Cl$ | 3 |
| Compound of the formula $H_2C=CH-CO-NH-CH_2-NH-CO-CH_2-Cl$ | 2 |
| Methacrylic acid | 2 |

The polymer dispersions thus obtained may be used as described in Example 6 for the preparation of prints on cotton or staple fibre which are fast to boiling, washing, rubbing and scrubbing.

We claim:

1. In a process for treating fibers by applying a pigment and an aqueous emulsion of a curable pigment binder wherein said binder comprises a copolymer of (a) a comonomer and (b) an olefinically unsaturated monomer which may contain hydroxyl groups and fixing the treated fiber by heating at about 80°–160° C. where the member (b) is selected from the group consisting of:

(1) α,β-olefinically unsaturated mono- and dicarboxylic acids, their amides, their nitriles, and their mono- and di-esters formed with a member selected from the group consisting of saturated monohydric alkanols with 1–20 carbons, dihydric saturated alcohols with 2–4 carbons, unsaturated alkanols, benzyl alcohol, phenol, cresol, and furfuryl alcohol (2) aromatic monovinyl compounds and mixtures thereof with divinyl benzene (3) esters of vinyl alcohol with carboxylic acids or hydroxylic acids; vinyl ethers, ketones, chloride, acetate, propionate, ethyl ether and isobutyl ether; and vinylidene chloride (4) conjugated diolefins with 4–6 carbons, (5) N-methylol ethers of acrylic acid and methacrylic acid amides of the formula

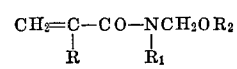

(6) Mannich bases of acrylic acid and methacrylic acid amide of the formula

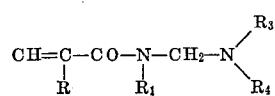

and (7) monoolefinically unsaturated aliphatic cycloaliphatic hydrocarbons;

wherein

R is H or methyl;
$R_1$ is H, alkyl, aralkyl, or aryl;
$R_2$ is alkyl or cyclialkyl, and
$R_3$ and $R_4$ are alkyl or cycloalkyl wherein $R_3$ and $R_4$ can be combined to form a saturated cyclic structure, the improvement which comprises using as comonomer (a) a member of the general formula

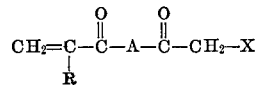

wherein R is selected from the group consisting of H and $CH_3$;

A is selected from the group consisting of

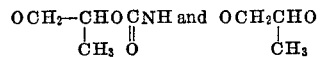

and X is selected from the group consisting of Cl and Br and fixing in an alkaline medium.

2. Process of claim 1 wherein a fiber-reactive dyestuff is also applied along with said pigment and aqueous emulsion of pigment binder for simultaneous printing and the heating is accomplished with moist steam to fix both the pigment dyestuff and the fiber-reactive dyestuff.

3. Process according to claim 1, characterised by adding alkali or alkali-yielding compounds to the composition.

4. Process according to claim 1, characterised by using compositions which are free from alkali or alkali-yielding compounds, and heating the material in an alkaline medium after treatment.

5. Process according to claim 1, characterised treating fibre materials selected from of natural and regenerated cellulose.

6. Fibre materials which are treated according to the processes of claim 1.

7. Fibre materials which are treated according to the processes of claim 1.

References Cited
FOREIGN PATENTS

| | | |
|---|---|---|
| 914,354 | 1/1963 | Great Britain. |
| 684,478 | 4/1964 | Great Britain. |
| 920,390 | 3/1963 | Great Britain. |
| 877,402 | 9/1961 | Great Britain. |

DONALD LEVY, Primary Examiner

B. BETTIS, Assistant Examiner

U.S. Cl. X.R.

8—116.3